US009638920B2

(12) United States Patent
Bohn (10) Patent No.: US 9,638,920 B2
(45) Date of Patent: May 2, 2017

(54) TORSIONAL SUPPORT FOR BINOCULAR DISPLAY

(71) Applicant: David D. Bohn, Fort Collins, CO (US)

(72) Inventor: David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 13/863,176

(22) Filed: Apr. 15, 2013

(65) Prior Publication Data

US 2014/0307315 A1 Oct. 16, 2014

(51) Int. Cl.
G02B 27/02 (2006.01)
G02B 27/01 (2006.01)
G02B 7/12 (2006.01)
G02B 6/122 (2006.01)

(52) U.S. Cl.
CPC .......... *G02B 27/0176* (2013.01); *G02B 6/122* (2013.01); *G02B 7/12* (2013.01); *G02B 2027/0132* (2013.01); *G02B 2027/0178* (2013.01)

(58) Field of Classification Search
CPC .... G02B 27/10; G02B 27/0905; G02B 27/14; G02B 27/144; G02B 23/18; G02B 27/2264; G02B 27/1066; G02B 27/143; G02B 19/0028; G02B 27/0172; G02B 27/2214; G02B 27/26; G02B 19/0014; G02B 19/0057; G02B 23/02; G02B 27/0927
USPC .......................... 359/480, 404, 407, 466, 618
See application file for complete search history.

(56) References Cited

U.S. PATENT DOCUMENTS

| 5,347,400 A | 9/1994 | Hunter |
| 6,683,584 B2 | 1/2004 | Ronzani et al. |
| 6,879,443 B2 | 4/2005 | Spitzer et al. |
| 7,924,503 B2 | 4/2011 | Buchon et al. |
| 8,004,769 B2 | 8/2011 | Spaller |

(Continued)

FOREIGN PATENT DOCUMENTS

| CN | 102004312 A | 4/2011 |
| CN | 102566052 A | 7/2012 |
| JP | 2012065242 A | 3/2012 |

OTHER PUBLICATIONS

ISA European Patent Office, International Search Report & Written Opinion for PCT/US2014/033907, WIPO, Aug. 21, 2014, 8 Pages.

(Continued)

*Primary Examiner* — Scott J Sugarman
*Assistant Examiner* — Sharrief Broome
(74) *Attorney, Agent, or Firm* — Alleman Hall McCoy Russell & Tuttle LLP (57) ABSTRACT

A binocular head mounted display includes a first binocular eye piece including a first torsional brace and a second binocular eye piece including a second torsional brace configured to engage the first torsional brace. The binocular head mounted also includes a frame assembly holding the first binocular eye piece and the second binocular eye piece at an adjustable interpupillary distance. The frame assembly includes a torsional support to directly or indirectly engage the first torsional brace and the second torsional brace. Such engagement resists rotational movement of the first binocular eye piece relative to the second binocular eye piece.

20 Claims, 6 Drawing Sheets

(56) References Cited

U.S. PATENT DOCUMENTS

| | | | |
|---|---|---|---|
| 8,040,600 B2 | 10/2011 | Pombo | |
| 2003/0083134 A1* | 5/2003 | Day | F16D 3/36 464/112 |
| 2004/0008158 A1 | 1/2004 | Chi et al. | |
| 2004/0212776 A1* | 10/2004 | Spitzer | G02B 27/0081 351/41 |
| 2007/0103774 A1* | 5/2007 | Woker | G02B 7/002 359/412 |
| 2008/0042038 A1* | 2/2008 | Pombo | G02B 23/18 248/544 |
| 2011/0241976 A1* | 10/2011 | Boger | G02B 27/0172 345/8 |
| 2012/0038543 A1 | 2/2012 | Martin et al. | |
| 2012/0162764 A1 | 6/2012 | Shimizu | |

OTHER PUBLICATIONS

Hua, et al., "An Ultra-light and Compact Design and Implementation of Head-Mounted Projective Displays", Retrieved at <<http://www.mindlab.org/images/d/DOC759.pdf, In Proceedings of IEEE Virtual Reality, Mar. 13, 2001, pp. 8.

Bayer, et al., "Introduction to Helmet-Mounted Displays", Retrieved at <<http://www.usaarl.army.mil/publications/HMD_Book09/files/Section%209%20-%20Chapter%203%20Introduction%20to%20Helmet-Mounted%20Displays.pdf>>, Retrieved Date: Feb. 9, 2013, pp. 62.

Best, Scot., "Perceptual and Oculomotor Implications of Interpupillary Distance Settings on a Head-Mounted Virtual Display", Retrieved at <<http://ieeexplore.ieee.org/stamp/stamp.jsp?tp=&arnumber=517685>>, In Proceedings of the IEEE National Aerospace and Electronics Conference, May 20, 1996, pp. 6.

The State Intellectual Property Office of China, First Office Action and Search Report issued in Chinese Patent Application No. 201480021536.X, Feb. 20, 2017, China, 13 pages (Submitted with partial English translation of Notice On The First Office Action and Search Report).

* cited by examiner

TORSIONAL SUPPORT FOR BINOCULAR DISPLAY

BACKGROUND

Computer animation allows a user to view computer simulated objects and environments on a display, such as a television or computer monitor. To increase a user's feeling of immersion into a computer generated environment, a user may view the computer generated environment through a virtual reality display. Such a virtual reality display may effectively block the user's perception of the real world so that the user feels completely immersed in the computer generated environment. To provide a feeling of complete immersion, while maintaining connection to the real world, an augmented reality display may incorporate augmented reality images into a user's actual view of the real world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A binocular head mounted display includes a first binocular eye piece including a first torsional brace and a second binocular eye piece including a second torsional brace configured to engage the first torsional brace. The binocular head mounted display also includes a frame assembly holding the first binocular eye piece and the second binocular eye piece at an adjustable interpupillary distance. The frame assembly includes a torsional support to directly or indirectly engage the first torsional brace and the second torsional brace. Such engagement resists rotational movement of the first binocular eye piece relative to the second binocular eye piece.

DETAILED DESCRIPTION

Augmented reality head mounted displays may be used to present complementary binocular images that originate from separate light sources. The binocular images should be precisely aligned on the display (i.e., precise horizontal, vertical, and rotational alignment) to facilitate perception of a single unified image by the left and right eyes of the user. If the images are not precisely aligned, the user will perceive a double image which can be disorienting. This disclosure is directed to a binocular head mounted display that maintains proper alignment of images while allowing an interpupillary distance of the binocular head mounted display to be adjusted.

Figure 1:
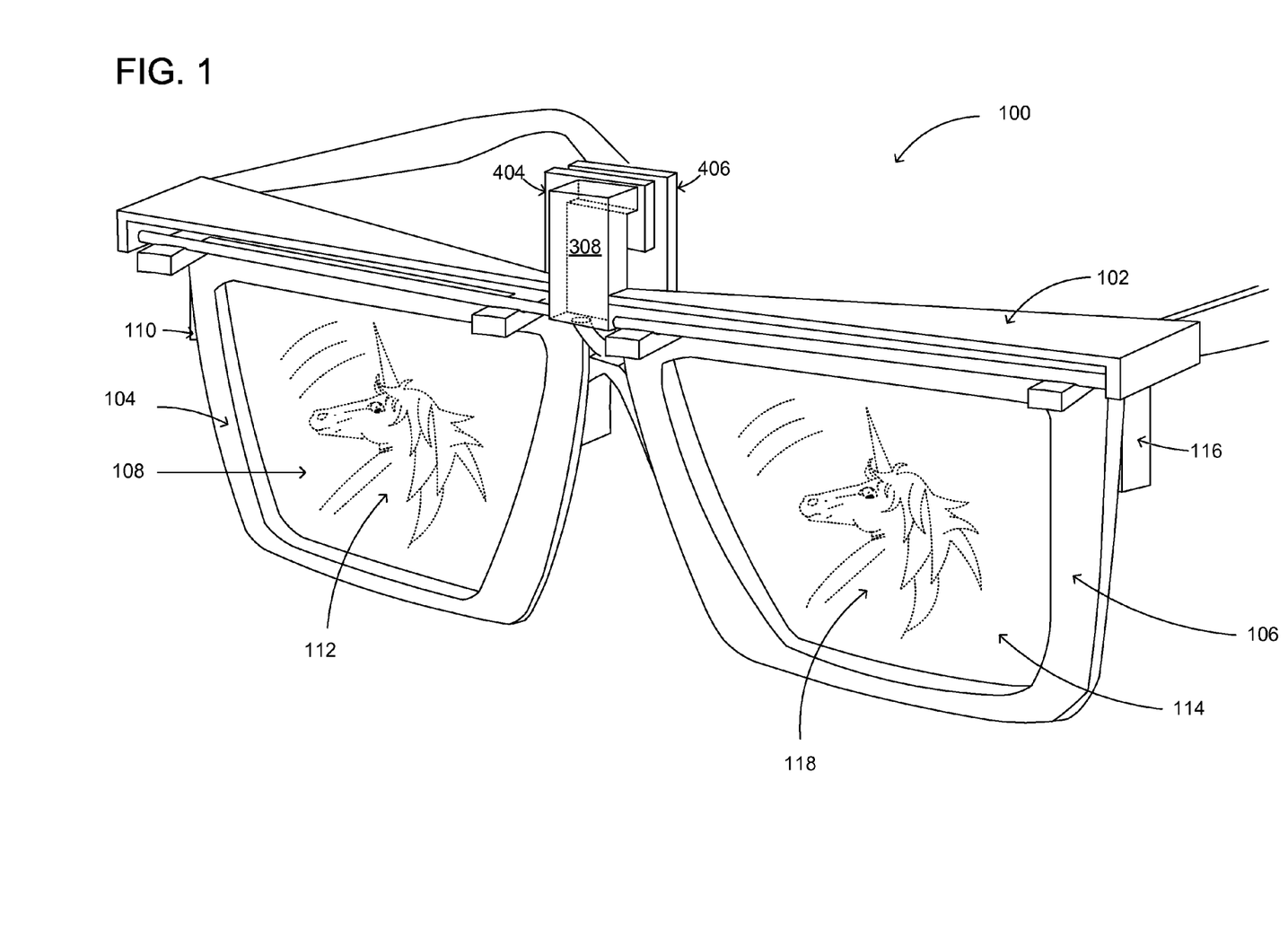
FIG. 1 shows an example binocular head mounted display.

FIG. 1 shows an example binocular head mounted display 100 used to display augmented reality images to a user. The binocular head mounted display 100 includes a frame assembly 102, a first (i.e., right) binocular eye piece 104, and a second (i.e., left) binocular eye piece 106. The frame assembly positions the binocular head mounted display 100 on a user's face and holds the first binocular eye piece 104 and the second binocular eye piece 106 at an adjustable interpupillary distance.

The first binocular eye piece and the second binocular eye piece present complementary augmented reality images to a user. The first binocular eye piece 104 includes a first waveguide 108 and a first light engine 110. The first light engine 110 is configured to project modulated light into the first waveguide 108 to be viewed as a first augmented reality image 112. The second binocular eye piece 106 includes a second waveguide 114 and a second light engine 116. The second light engine 116 is configured to project modulated light into the second waveguide 114 to be viewed as a second augmented reality image 118.

The first augmented reality image 112 and the second augmented reality image 118 may augment the scene that is visible to the user through the waveguides. For example, a user may be looking at an empty room through the waveguides, but may perceive an augmented reality in which a unicorn appears to be in the room. Viewable images may appear to be at least partially transparent or fully opaque. For example, an opaque image can be used to effectively block a user's view of real world objects in a scene.

Figure 2:
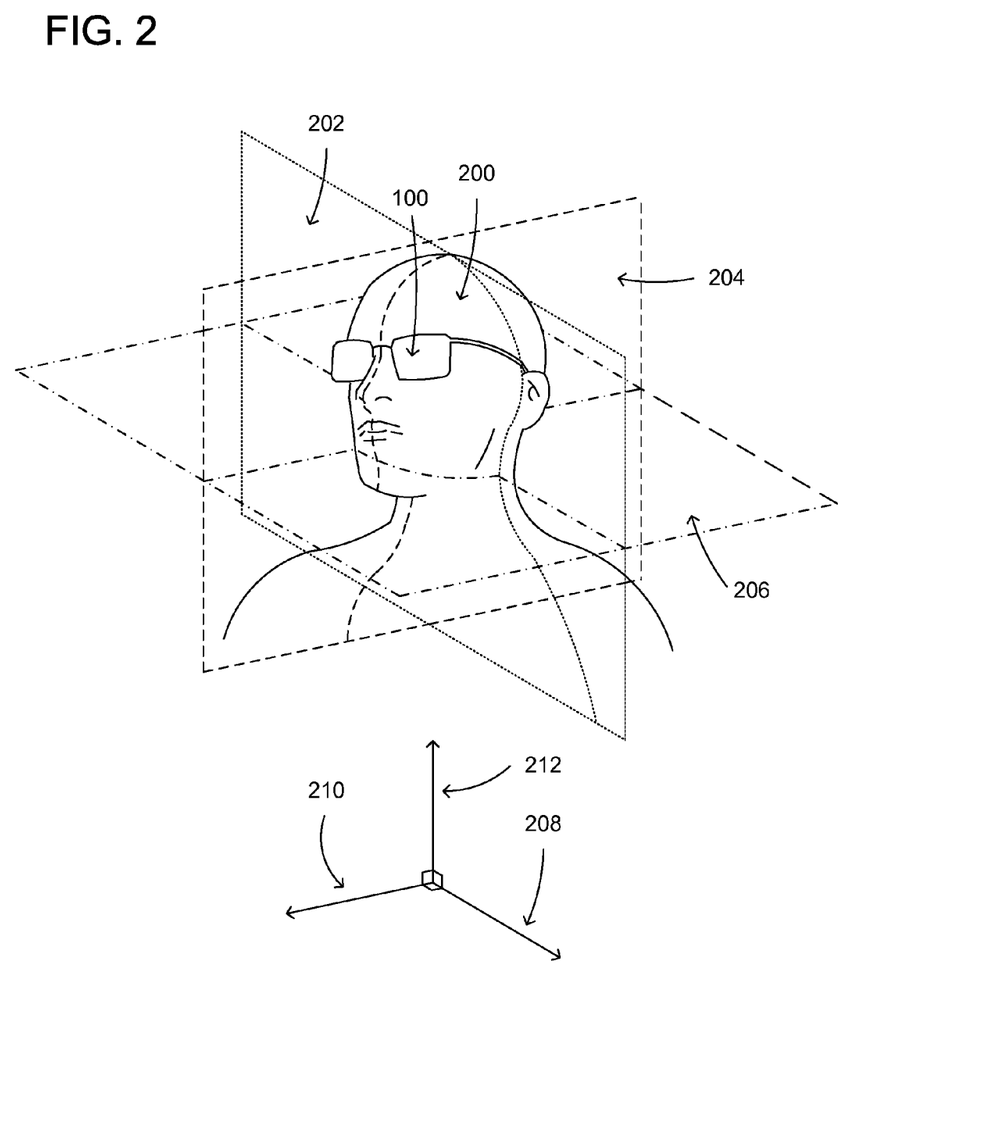
FIG. 2 shows an orientation of a binocular head mounted display on a user's head.

Different potential wearers of the binocular head mounted display may have different interpupillary distances. As such, the binocular head mounted display is configured so that the first binocular eye piece may be moved relative to the second binocular eye piece to change an interpupillary distance of the binocular head mounted display. Movement of the first binocular eye piece 104 and the second binocular eye piece 106 may be described with reference to a defined orientation of a head wearing the binocular head mounted display. As shown in FIG. 2, a head 200 wearing binocular head mounted display 100 may be described by a coronal plane 202, separating a front of the head from a back of the head, a sagittal plane 204, separating a left of the head from a right of the head, and a transverse plane 206, separating a top of the head from a bottom of the head. An interpupillary axis 208 may be perpendicular to the sagittal plane 204, a visual axis 210 may be perpendicular to the coronal plane 202, and a transverse axis 212 may be perpendicular to the transverse plane 206.

As described herein, the distance between the right and left eye pieces may be adjusted along the interpupillary axis to accommodate different anatomies of different users. However, so as to preserve proper alignment of binocular images, the disclosed binocular head mounted display prevents rotation of the left eye piece relative to the right eye piece about any of the interpupillary, visual, and transverse axes.

Figure 3:
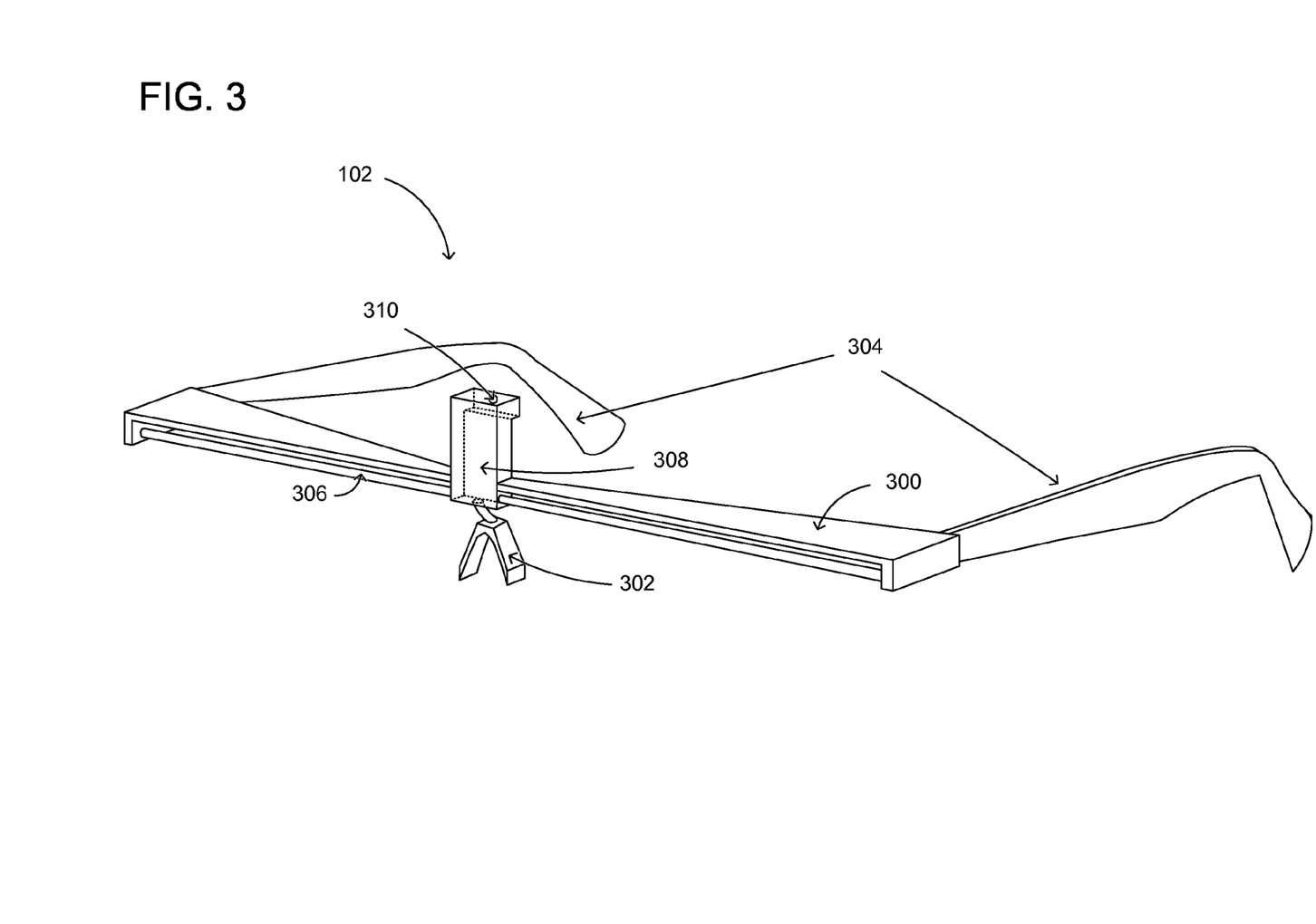
FIG. 3 shows an isolated view of a frame assembly of the binocular head mounted display of FIG. 1.

FIG. 3 shows an isolated view of frame assembly 102 of the binocular head mounted display of FIG. 1. Frame assembly 102 includes a brow piece 300, a nose piece 302, and temple arms 304. The nose piece 302, located at the center of the brow piece 300, positions the binocular head mounted display on the user's nose. The temple arms, located on the sides of the brow piece 300, position the binocular head mounted display on the user's ears.

The frame assembly 102 includes a rod 306 lying parallel to the interpupillary axis. Nose piece 302 may have a fixed position relative to rod 306 such that nose piece 302 bisects rod 306. Rod 306 provides a common reference for the attachment of the first binocular eye piece and the second binocular eye piece of FIG. 1. More specifically, the rod 306 may align the first binocular eye piece and the second binocular eye piece at an adjustable interpupillary distance. Rod 306 may have a circular or other suitable cross sectional shape and may be constructed from metal, metal alloy, plastic, and/or another sufficiently stiff material. The rod 306 may be a one piece rod, as shown, or the rod may be segmented into two or more separate pieces held in a fixed position by the frame assembly.

Figure 4A:
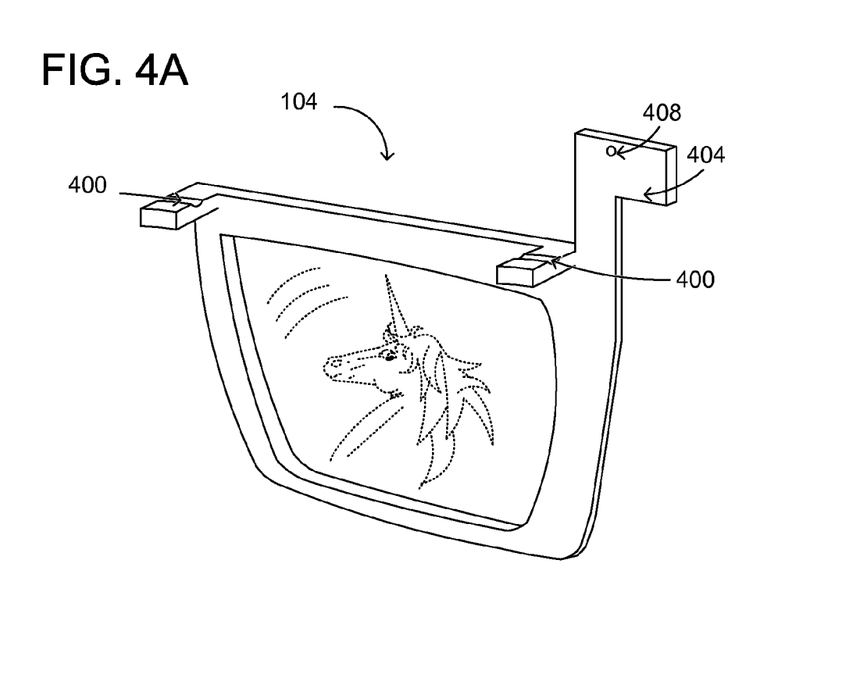
FIG. 4A shows an isolated view of a right eye piece of the binocular head mounted display of FIG. 1.

FIG. 4A shows an isolated view of first binocular eye piece 104 of the binocular head mounted display of FIG. 1. The first binocular eye piece 104 includes one or more slides 400 that adjustably mate with the rod of FIG. 3. The one or more slides 400 of the first binocular eye piece 104 are adjustably moveable along the rod to adjust a distance of the first binocular eye piece 104 from the nose piece. The one or more slides 400 may be shaped to complement the shape of the rod.

Figure 4B:
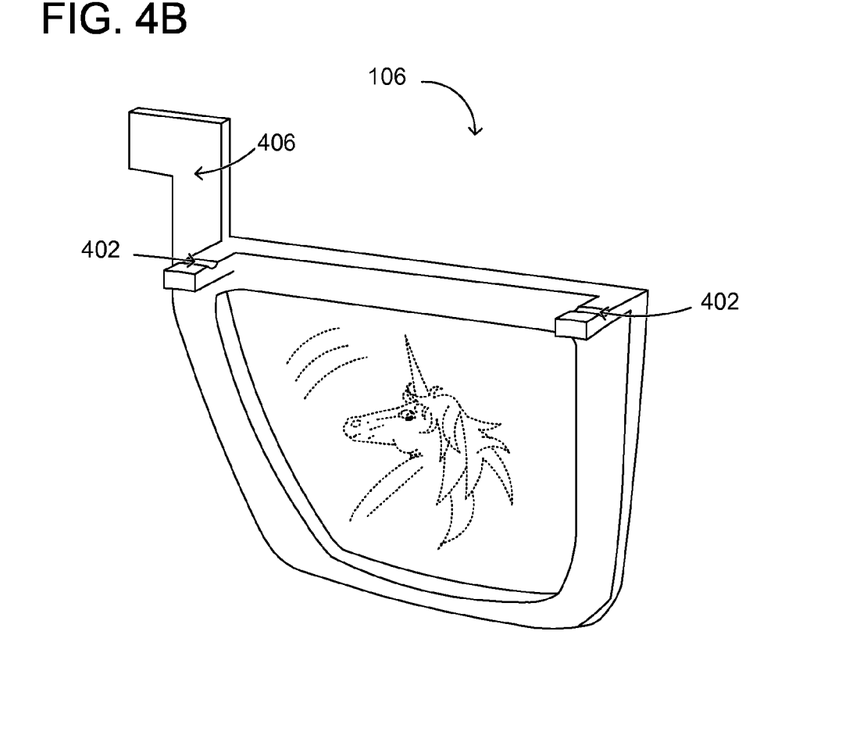
FIG. 4B shows an isolated view of a left eye piece of the binocular head mounted display of FIG. 1.

FIG. 4B shows an isolated view of second binocular eye piece 106 of the binocular head mounted display of FIG. 1. The second binocular eye piece 106 also includes one or more slides 402 that adjustably mate with the rod of FIG. 3. The one or more slides 402 of the second binocular eye piece 106 are adjustably movable along the rod to adjust a distance of the second binocular eye piece 106 from the nose piece.

When considered together, the slides of the first binocular eye piece and the slides of the second binocular eye piece allow the first binocular eye piece and the second binocular eye piece to move along the rod to change the adjustable interpupillary distance.

The first binocular eye piece 104 may be adjustably coupled to the second binocular eye piece 106 such that the first binocular eye piece 104 moves equal and opposite the second binocular eye piece 106 along the rod 306. For example, a lead screw may be used to maintain an equal distance between the nose piece and the binocular eye pieces.

The one or more slides 400 of the first binocular eye piece 104 and the one or more slides 402 of the second binocular eye piece 106 may be shaped to allow the first binocular eye piece 104 and the second binocular eye piece 106 to rotate together about the rod 306. Such rotation may provide tolerance in the adjustment mechanism. However, because the binocular eye pieces are constrained to rotate together, as discussed below, proper alignment of augmented reality images may be maintained.

Figure 5:
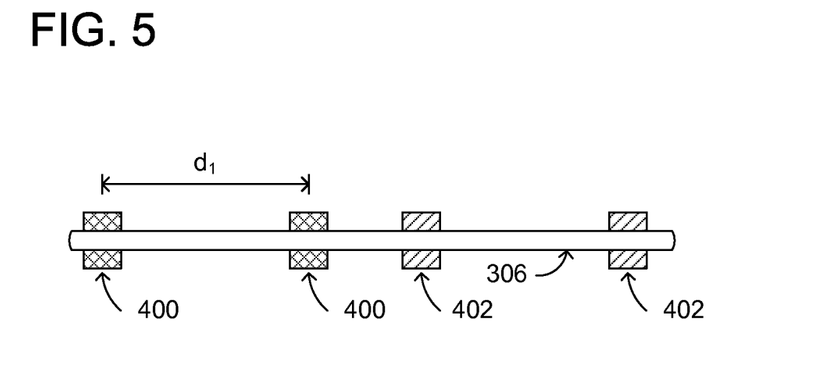
FIG. 5 shows an isolated cross-sectional view of eye piece slides engaging a rod of the frame assembly of FIG. 3.

FIG. 5 shows an isolated cross-sectional view of the one or more slides 400 of the left eye piece and the one or more slides 402 of the right eye piece engaging the rod 306. With this arrangement, the two slides of each eye piece are separated from each other by the distance $d_1$.

Figure 6:
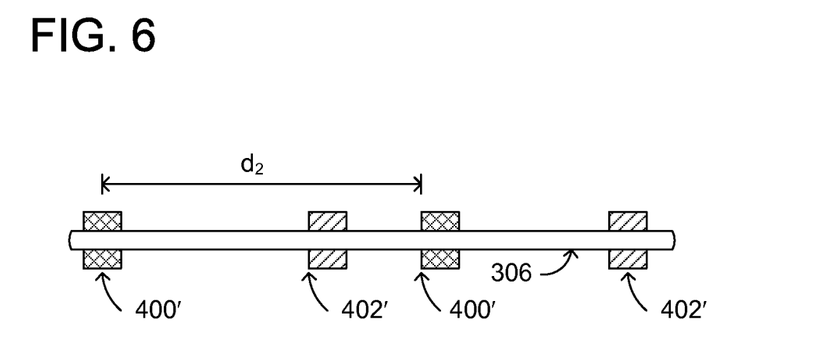
FIG. 6 shows an isolated cross-sectional view of overlapped eye piece slides engaging a rod of the frame assembly of FIG. 3.

FIG. 6 shows an isolated cross-sectional view of a different arrangement in which one or more slides 400' of the left eye piece and one or more slides 402' of the right eye piece overlap one another while engaging the rod 306. With this arrangement, the two slides of each binocular eye piece are separated from each other by an increased distance $d_2$. Increasing a distance between the slides of each eye piece may increase resistance to rotation about an axis parallel to the visual axis and/or the transverse axis.

As shown in FIG. 3, the frame assembly 102 includes a torsional support 308 that extends away from the nose piece 302 and has a fixed position relative to the rod 306. As shown in FIG. 4A, first binocular eye piece 104 includes a first torsional brace 404, and as shown in FIG. 4B, second binocular eye piece 106 includes a second torsional brace 406. As shown in FIG. 1, the torsional support 308 may directly engage the first torsional brace 404 and indirectly engage the second torsional brace 406 via the first torsional brace 404. Such physical engagement mechanically resists rotational movement of the first binocular eye piece 104 relative to the second binocular eye piece 106. Consequently, the torsional support constrains and unifies rotational movement of the first binocular eye piece 104 relative to the second binocular eye piece 106 about the rod 306. This coupling of rotational movement between the binocular eye pieces helps reduce misalignments in augmented reality images due to unconstrained rotations about the interpupillary axis.

The torsional support 308, the first torsional brace 404, and the second torsional brace 406 may extend any suitable distance away from the rod in any suitable direction. In general, a longer extension may provide more torsional support. It is believed that a 15-20 mm extension provides adequate torsional support for most uses. In the illustrated embodiment, the torsional support and torsional braces extend above the rod. Such positioning avoids vision obstruction while allowing a sufficiently long lever arm. Other positions may be used for functional and/or aesthetic reasons. The torsional support and the torsional braces may have any suitable shape that allows interpupillary adjustments while maintaining torsional support. In some examples, the torsional support and the torsional braces may include planar faces for interfacing with one another.

In some examples, the first torsional brace 404 of the first binocular eye piece 104 may include a bearing 408, shown in FIG. 4A, which maintains point contact directly with the second torsional brace 406 of the second binocular eye piece 106. The torsional support 308 of the frame assembly 102 may also include a bearing 310, shown in FIG. 3, which maintains point contact directly with the first torsional brace 404 of the first binocular eye piece 104. The bearings may reduce over constrained movement of the binocular eye pieces. It is to be understood that more bearings or other point contacts may be used. Further, the location of the bearings may be other than as illustrated.

In some examples, a biasing mechanism may be used to bias the second torsional brace 406 toward the first torsional brace 404 and to bias the first torsional brace 404 toward the torsional support 308 to constrain and unify rotational movement of the first waveguide 108 and the second waveguide 114 about the rod. In some examples the biasing mechanism may include a spring, a clip, or any other suitable mechanism capable of appropriately biasing the respective components.

Figure 7:
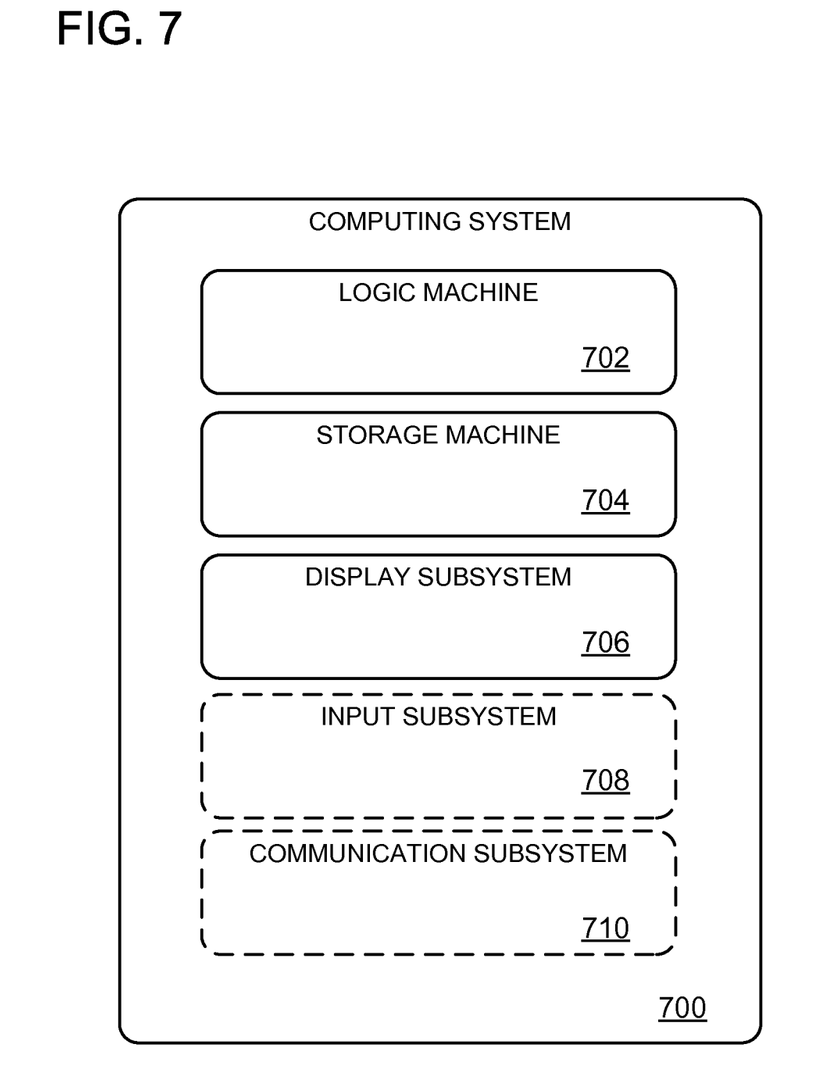
FIG. 7 shows an example computing system for use with a binocular head mounted display.

FIG. 7 schematically shows a non-limiting embodiment of a computing system 700 of binocular head mounted display 100 of FIG. 1. Computing system 700 may be integrated into binocular head mounted display 100 or implemented as a peripheral controller physically separate from the binocular head mounted display 100.

Computing system 700 includes a logic machine 702, a storage machine 704, and a display subsystem 706 for driving one or more light engines, such as first light engine 110 and/or second light engine 116 of FIG. 1. Computing system 700 may optionally include an input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 706 may be used to present a visual representation of data held by storage machine 704 via first light engine 110 and second light engine 116 of FIG. 1. This visual representation may take the form of augmented reality images, as described above. As the herein described methods and processes change the data held by the storage machine, and thus transform the state of the storage machine, the state of display subsystem 706 may likewise be transformed and cause the light engines to visually represent changes in the underlying data.

When included, input subsystem 708 may comprise or interface with one or more user-input devices. In some embodiments, the input subsystem may comprise or interface with selected natural user input (NUI) componentry. Such componentry may be integrated or peripheral to the binocular head mounted display and/or computing system, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. A binocular head mounted display, comprising:
a first binocular eye piece including a first torsional brace;
a second binocular eye piece including a second torsional brace configured to engage the first torsional brace; and
a frame assembly holding the first binocular eye piece and the second binocular eye piece at an adjustable inter-pupillary distance, the frame assembly including a torsional support to engage at least one of the first torsional brace and the second torsional brace to resist rotational movement of the first binocular eye piece relative to the second binocular eye piece, resist rotational movement of both eye pieces relative to the frame assembly, and prevent rotational misalignment between the first binocular eye piece and the second binocular eye piece.

2. The binocular head mounted display of claim 1, wherein the first binocular eye piece includes a first waveguide and a first light engine, the first light engine being configured to project modulated light into the first waveguide to be viewed as augmented reality images through the first waveguide; and wherein the second binocular eye piece includes a second waveguide and a second light engine, the second light engine being configured to project modulated light into the second waveguide to be viewed as augmented reality images through the second waveguide.

3. The binocular head mounted display of claim 1, wherein the frame assembly includes a rod, the first binocular eye piece includes one or more slides that adjustably mate with the rod, and the second binocular eye piece includes one or more slides that adjustably mate with the rod, the one or more slides of the first binocular eye piece and the one or more slides of the second binocular eye piece allowing the first binocular eye piece and the second binocular eye piece to move along the rod to change the adjustable interpupillary distance.

4. The binocular head mounted display of claim 3, wherein the first binocular eye piece is adjustably coupled to the second binocular eye piece such that the first binocular eye piece moves equal and opposite the second binocular eye piece along the rod.

5. The binocular head mounted display of claim 3, wherein the one or more slides of the first binocular eye piece and the one or more slides of the second binocular eye piece overlap.

6. The binocular head mounted display of claim 3, wherein the torsional support of the frame assembly extends 15-20 mm away from the rod.

7. The binocular head mounted display of claim 3, wherein the first torsional brace of the first binocular eye piece and the second torsional brace of the second binocular eye piece each extend 15-20 mm away from the rod.

8. The binocular head mounted display of claim 3, wherein the one or more slides of the first binocular eye piece and the one or more slides of the second binocular eye piece allow the first binocular eye piece and the second binocular eye piece to rotate about the rod.

9. The binocular head mounted display of claim 3, wherein the torsional support engages at least one of the first torsional brace and the second torsional brace to constrain and unify rotational movement of the first binocular eye piece and the second binocular eye piece about the rod.

10. The binocular head mounted display of claim 1, wherein the torsional support of the frame assembly includes a bearing which maintains point contact directly with the first torsional brace of the first binocular eye piece.

11. The binocular head mounted display of claim 10, wherein the first torsional brace of the first binocular eye piece includes a bearing which maintains point contact directly with the second torsional brace of the second binocular eye piece.

12. The binocular head mounted display of claim 1, wherein the first binocular eye piece is a right eye binocular eye piece.

13. The binocular head mounted display of claim 1, wherein the frame assembly includes a nose piece, and the torsional support extends away from the nose piece.

14. The binocular head mounted display of claim 1, wherein the frame assembly includes temple arms.

15. A binocular head mounted display, comprising:
a rod;
a nose piece in a fixed position relative to the rod;
a first binocular eye piece including a first torsional brace and one or more slides adjustably moveable along the rod to adjust a distance of the first binocular eye piece from the nose piece;
a second binocular eye piece including a second torsional brace configured to engage the first torsional brace and one or more slides adjustably movable along the rod to adjust a distance of the second binocular eye piece from the nose piece; and
a torsional support in a fixed position relative to the rod to engage at least one of the first torsional brace and the second torsional brace to resist rotational movement of the first binocular eye piece relative to the second binocular eye piece, resist rotational movement of both binocular eye pieces relative to the rod, and prevent rotational misalignment between the first binocular eye piece and the second binocular eye piece.

16. The binocular head mounted display of claim 15, wherein the first binocular eye piece includes a first waveguide and a first light engine, the first light engine being configured to project modulated light into the first waveguide to be viewed as augmented reality images through the first waveguide; and wherein the second binocular eye piece includes a second waveguide and a second light engine, the second light engine being configured to project modulated light into the second waveguide to be viewed as augmented reality images through the second waveguide.

17. The binocular head mounted display of claim 16, wherein the first binocular eye piece is adjustably coupled to the second binocular eye piece such that the first binocular eye piece moves equal and opposite the second binocular eye piece along the rod.

18. The binocular head mounted display of claim 16, wherein the one or more slides of the first binocular eye piece and the one or more slides of the second binocular eye piece overlap.

19. The binocular head mounted display of claim 16, wherein the torsional support engages at least one of the first torsional brace and the second torsional brace to constrain and unify rotational movement of the first binocular eye piece and the second binocular eye piece about the rod.

20. A binocular head mounted display, comprising:
a first binocular eye piece including a first torsional brace, one or more slides, a first waveguide, and a first light engine configured to project modulated light into the first waveguide to be viewed as augmented reality images through the first waveguide;
a second binocular eye piece including a second torsional brace engaging the first torsional brace, one or more slides, a second waveguide, and a second light engine configured to project modulated light into the second waveguide to be viewed as augmented reality images through the second waveguide;
a frame assembly including a rod and a torsional support, the rod holding the first binocular eye piece in any of a first plurality of different adjustable positions and holding the second binocular eye piece in any of a second plurality of adjustable positions to provide an adjustable interpupillary distance between the first binocular eye piece and the second binocular eye piece, the torsional support directly engaging the first torsional brace and the first torsional brace directly engaging the second torsional brace in any of the first plurality and second plurality of adjustable positions; and a biasing mechanism to bias the second torsional brace toward the first torsional brace and to bias the first torsional brace toward the torsional support to constrain and unify rotational movement of the first waveguide and the second waveguide about the rod and prevent rotational misalignment between the first binocular eye piece and the second binocular eye piece.

\* \* \* \* \*